United States Patent
Sallee et al.

(10) Patent No.: US 12,330,627 B2
(45) Date of Patent: Jun. 17, 2025

(54) ADJUSTABLE SLIP TARGETS BASED ON ACCELERATOR PEDAL

(71) Applicant: Rivian IP Holdings, LLC, Irvine, CA (US)

(72) Inventors: Kevin Jared Sallee, Lake Forest, CA (US); Michael Fei-Kit Tung, Irvine, CA (US); Nicholas Alan Chenoweth, Mission Viejo, CA (US); Shuyang Wang, Laguna Niguel, CA (US); Quentin Arthur Cradock Watson Spottiswoode, York Close (GB)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/343,601

(22) Filed: Jun. 28, 2023

(65) Prior Publication Data
US 2025/0002002 A1    Jan. 2, 2025

(51) Int. Cl.
*B60W 30/02* (2012.01)
*B60W 40/068* (2012.01)

(52) U.S. Cl.
CPC .......... *B60W 30/02* (2013.01); *B60W 40/068* (2013.01); *B60W 2510/083* (2013.01); *B60W 2520/26* (2013.01); *B60W 2540/10* (2013.01); *B60W 2556/45* (2020.02)

(58) Field of Classification Search
CPC ............... B60W 30/02; B60W 40/068; B60W 2556/45; B60W 2510/083; B60W 2520/26; B60W 2540/10
See application file for complete search history.

(56) References Cited

U.S. PATENT DOCUMENTS

| | | | |
|---|---|---|---|
| 5,508,924 A * | 4/1996 | Yamashita | B60L 3/102 701/91 |
| 5,555,499 A | 9/1996 | Yamashita et al. | |
| 5,631,829 A | 5/1997 | Takasaki et al. | |
| 7,853,389 B2 | 12/2010 | Luehrsen et al. | |
| 8,244,445 B2 | 8/2012 | Luehrsen et al. | |
| 9,475,395 B2 | 10/2016 | Beever et al. | |
| 9,493,160 B2 | 11/2016 | Kelly et al. | |
| 10,754,340 B1 | 8/2020 | Corbett et al. | |
| 11,281,223 B2 | 3/2022 | Corbett et al. | |
| 11,543,821 B2 | 1/2023 | Corbett et al. | |
| 2006/0199697 A1* | 9/2006 | Kirkwood | F16D 48/064 477/5 |

(Continued)

OTHER PUBLICATIONS

Non-Final Office Action on U.S. Appl. No. 18/146,672 dated Jun. 24, 2024.

(Continued)

*Primary Examiner* — Andrew J Cromer
(74) *Attorney, Agent, or Firm* — Foley & Lardner LLP

(57) ABSTRACT

Slip target adjustment based on an accelerator pedal is provided. A system can detect an amount of torque requested for a vehicle. The system can determine a friction level associated with a surface on which the vehicle traverses. The system can select a slip target modifier. The selection can be based on the amount of torque requested for the vehicle and the friction level. The system can adjust a slip target used by a traction control system of the vehicle. The adjustment can be based on the slip target modifier.

19 Claims, 8 Drawing Sheets

(56) References Cited

U.S. PATENT DOCUMENTS

| | | | |
|---|---|---|---|
| 2007/0184929 A1* | 8/2007 | Piyabongkarn | F16H 48/34 475/84 |
| 2009/0112437 A1* | 4/2009 | Luehrsen | B60W 30/188 701/84 |
| 2016/0001698 A1 | 1/2016 | Hall et al. | |
| 2017/0174192 A1 | 6/2017 | Ying | |
| 2020/0290596 A1 | 9/2020 | Birch et al. | |
| 2020/0406999 A1 | 12/2020 | Corbett et al. | |
| 2020/0407013 A1 | 12/2020 | Corbett et al. | |
| 2020/0409370 A1 | 12/2020 | Corbett et al. | |
| 2020/0409381 A1 | 12/2020 | Corbett et al. | |
| 2021/0078581 A1* | 3/2021 | Velazquez Alcantar | B60L 3/10 |
| 2022/0063672 A1 | 3/2022 | Corbett et al. | |
| 2022/0063758 A1 | 3/2022 | Corbett et al. | |
| 2022/0066448 A1 | 3/2022 | Corbett et al. | |
| 2022/0155787 A1 | 5/2022 | Corbett et al. | |
| 2022/0219775 A1 | 7/2022 | Corbett et al. | |
| 2022/0219776 A1 | 7/2022 | Corbett et al. | |
| 2022/0219777 A1 | 7/2022 | Corbett et al. | |
| 2022/0219778 A1 | 7/2022 | Corbett et al. | |
| 2022/0227376 A1 | 7/2022 | Corbett et al. | |
| 2022/0227455 A1 | 7/2022 | Corbett et al. | |

OTHER PUBLICATIONS

Notice of Allowance on U.S. Appl. No. 18/146,672 dated Nov. 21, 2024.

* cited by examiner

ADJUSTABLE SLIP TARGETS BASED ON ACCELERATOR PEDAL

INTRODUCTION

Vehicles can drive on various types of roads or surfaces. Depending on the type of road or surface, it can be challenging to control an operation of the vehicle. Moreover, efficient control of traction and motor torque when driving on certain types of surfaces can help reduce energy loss and improve battery performance of electric vehicles.

SUMMARY

This technical solution is generally directed to adjusting slip targets for vehicles, such as electric vehicles. For example, a vehicle can include a traction control system which inhibits torque applied to wheels having relatively low traction with a road or other surface. A difference between the wheel speed and the vehicle speed (e.g., a slip amount) may be compared to a slip target. The systems and methods disclosed herein can control motor torque based on slip target adjustments based on a user input. The control of motor torque may increase a tractive effort for some surfaces (e.g., sand, gravel, or slush ice) which can reduce energy lost to unproductive wheel-spin. The control of motor torque can reduce battery power which may, in turn, increase vehicle range, decrease recharge times, and decrease carbon intensity of vehicle charging. Further, adjustable slip targets can improve a qualitative and quantitative control of a vehicle. Qualitatively, such a system may increase a connectedness between a vehicle and a driver relative to systems with non-adjustable slip targets, since incremental accelerator input applied by a user may can result in a corresponding increase in torque applied to a wheel. Quantitatively, a user may desire to cause a vehicle to oversteer or understeer (e.g., to avoid reducing speed to maneuver a corner or otherwise maintain momentum navigating a circuit, which may further reduce energy use relative to braking and re-accelerating).

At least one aspect is directed to a system. The system can include one or more processors of a vehicle, coupled with memory. The one or more processors can detect an amount of torque requested for a vehicle. The one or more processors can determine a friction level associated with a surface on which the vehicle traverses. The one or more processors can select a slip target modifier. The selection can be based on the amount of torque requested for the vehicle and the friction level. The one or more processors can adjust a slip target used by a traction control system of the vehicle. The adjustment can be based on the slip target modifier.

At least one aspect is directed to a method. The method can be performed by one or more processors, coupled with memory, of a vehicle. The method can include the one or more processors detecting an amount of torque requested for a vehicle. The method can include the one or more processors determining a friction level of a surface on which the vehicle traverses. The method can include the one or more processors selecting, based on the amount of torque requested for the vehicle and the friction level, a slip target modifier. The method can include the one or more processors adjusting a slip target used by a traction control system of the vehicle based on the slip target modifier.

At least one aspect is directed to an electric vehicle. The electric vehicle can include one or more processors and memory. The one or more processors can detect an amount of torque requested for the electric vehicle. The one or more processors can determine a friction level of a surface on which the electric vehicle traverses. The one or more processors can select, based on the amount of torque requested for the electric vehicle and the friction level, a slip target modifier. The one or more processors can adjust a slip target used by a traction control system of the electric vehicle based on the slip target modifier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
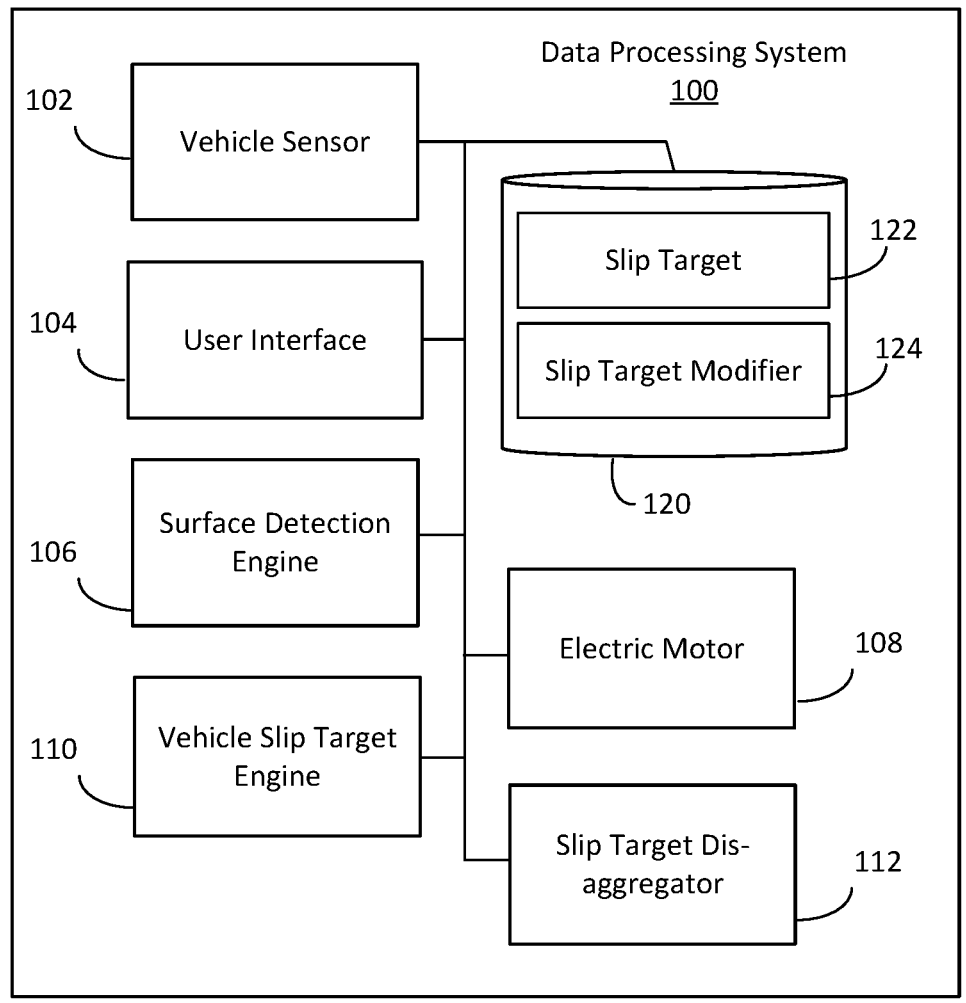
FIG. 1 depicts an example system to adjust slip targets based on an accelerator pedal.

Following below are more detailed descriptions of various concepts related to, and implementations of, methods, apparatuses, and systems of adjustable slip targets. The various concepts introduced above and discussed in greater detail below may be implemented in any of numerous ways.

This technical solution is generally directed to systems and methods for adjustable slip targets. An adjustable slip target can control motor torque to one or more wheels or axles of a vehicle. The adjustable slip targets can be employed in combination with another input (e.g., a user input such as an accelerator pedal) to vary a wheel slip target, such that a user can modulate the slip target when traveling over certain surfaces, such as low traction surfaces. The adjustments can employ efficient control of motor torque, which can preserve battery power. The adjustment of the slip targets can cause the vehicle to continue to respond to user inputs beyond a tractive limit. For example, a vehicle occupant can cause wheel spin by applying depressing an accelerator pedal. Such wheel spin may be desirable for navigating some low traction surfaces such as sand, slush, and silt, with greater efficiency than lower wheel spin, and may decrease a risk of becoming beached when traversing a deformable surface. Moreover, a perceptible response of a vehicle in response to a user input may support driver confidence.

In an illustrative example, a vehicle includes various sensors to determine a characteristic, such as a friction level or coefficient of friction, of a surface. The vehicle can include a data structure correlating a coefficient of friction with a slip target. A physical or other traction control button (e.g., implemented on a touch screen device of a vehicle) can receive an indication of a selected drive mode. The selection of the traction control button may alternate between a mode with a fixed slip target, and a slip target that varies according to an accelerator pedal position. The depression of the accelerator pedal can adjust a slip limit upwards, such that a vehicle operator can cause increased wheel-spin by increasing a throttle position.

The disclosed solutions have a technical advantage of decreasing an energy use of an electric vehicle. For example, some surfaces may be more efficiently traversed while employing increased wheel spin. However, permitting increased wheel spin by one or more wheels or axles may be undesirable for some vehicle operators. For example, a vehicle operator may wish to avoid wheel spinning on a low traction surface such as an icy patch on a highway, but may prefer increased wheel-spin when navigating another low-traction surface, or a same low traction surface at another time. By adjusting a slip target responsive to an input such as an accelerator pedal, a vehicle operator can maintain traction at low acceleration inputs, while increasing slip targets at higher throttle inputs (e.g., inputs which are indicative of a user intent to apply additional torque to wheels). Moreover, a semi-autonomous or autonomous system can select a drive mode based on a surface characteristic (e.g., coefficient of friction) which increases energy efficiency, decreases a chance of a vehicle becoming stuck, or increases occupant comfort.

FIG. 1 depicts an example data processing system 100 to adjust slip targets for an electric vehicle. The data processing system 100 can be part of, hosted by, or otherwise integrated with a component of the electrical vehicle. The data processing system 100 can include at least one vehicle sensor 102. The data processing system 100 can include at least one user interface 104. The data processing system 100 can include at least one surface detection engine 106. The data processing system 100 can include at least one electric motor 108. The data processing system 100 can include at least one vehicle slip target engine 110. The data processing system 100 can include at least one slip target disaggregator 112.

The vehicle sensors 102, user interface 104, surface detection engine 106, electric motor 108, vehicle slip target engine 110, or slip target disaggregator 112 can each include at least one processing unit or other logic device such as programmable logic array engine, or module configured to communicate with the vehicle data repository 120 or database. The vehicle sensors 102, user interface 104, surface detection engine 106, electric motor 108, vehicle slip target engine 110, or slip target disaggregator 112 can be separate components, a single component, or part of the electric vehicle, and can include or interface with, or be components of, a traction control system. The data processing system 100 can include hardware elements, such as one or more processors, logic devices, or circuits. For example, the data processing system 100 can include one or more components or structures of functionality of computing devices depicted in FIG. 8. The various components of the data processing system 100 can be in network communication via a controller area network (CAN), Ethernet, or any number of other wired or wireless networks.

The data repository 120 can include one or more local or distributed databases, and can include a database management system. The data repository 120 can include computer data storage or memory and can store one or more data structures, such as a slip target 122 or slip target modifier 124.

A slip target 122 can refer to or include a target for a difference between a vehicle speed and a wheel speed. The slip target can include a measured speed of one or more wheels or a value derived therefrom (e.g., minimum wheel speed, average wheel speed, maximum wheel speed, or so forth). The difference can be measured as a percent of vehicle speed or wheel speed, or a difference in velocity. For example, a slip target can be expressed as 20% of vehicle speed or 20 kilometers per hour (kph). The data repository 120 can include various slip targets 122. For example, a first slip target 122 can correspond to a default drive mode, and a second slip target 122 can correspond to a track, off-road, or disengagement (e.g., partial disengagement) of a traction control system. Thus, when traveling in gravel, sand, silt, or along a closed course, the vehicle can rotate one or more wheels at a speed exceeding a vehicle speed according to a selected slip target 122.

A slip target modifier 124 can refer to or include an operator applied to a slip target 122. For example, the slip target modifier 124 can be an offset from a slip target 122, a multiplier for the slip target 122, an incremental value to add to a baseline slip target 122, or another operator or function to derive an adjusted slip target 122 based on a slip target 122 in combination with an input. The input can include an amount of torque requested such that a value of a slip target corresponds to the torque request. The amount of torque may not equal the amount of torque requested. For example, the torque generated can be less than the requested torque; a request for 1000 newton-meters (Nm) can correspond to a greater slip target modifier 124 than a request for 500 newton-meters. However, the respective requests can correspond to a 10% and 25% increase in a slip target (e.g., a 20 kph slip target can be adjusted to 22 kph or 25 kph, respectively). For example, for a sheer ice surface, the targets can correspond to about 70 Nm and about 75 Nm of torque, rather than the 1000 Nm or 500 Nm requested.

A data structure can include one or more slip target modifiers 124. For example, a data structure can refer to a look up table (LUT) containing various slip target modifiers 124 related to a vehicle. The LUT can include one or more dimensions such as a friction level (e.g., coefficient of friction), a requested torque, a surface type, a battery level, or a temperature. A LUT can be stored in various formats such as an array, linked list, or a function. For example, a function can describe a relationship between a various dimensions such that upon a receipt of information (e.g., a friction level and a requested torque), the data processing system 100 can select a corresponding slip target modifier 124. Advantageously, a function based data processing system 100 can include high granularity with little data storage. Advantageously, a non-function based LUT (e.g., a pre-populated table) can reduce latency of data retrieval, or reduce processor loading.

The vehicle sensor 102 can include sensors designed, constructed, or operational to determine a state of a vehicle such as an electric vehicle. Vehicle sensors 102 can include wheel speed sensors to determine a speed of a vehicle wheel, or a vehicle orientation. The vehicle sensors 102 can include current sensors or voltage sensors to characterize energy flow between a battery and one or more electric motors 108, differentials, or other drive train components. Vehicle sensors 102 can include time of flight sensors such as radar, LiDAR, ultrasonic sensors, or the like, which can determine a vehicle speed relative to an environment. Vehicle sensors 102 can include accelerometers to determine an acceleration (e.g., roll, pitch, or yaw) of the vehicle. The various vehicle sensors 102 can provide sensor data to other components of the data processing system 100 such as the surface detection engine 106.

The user interface 104 can include controls designed, constructed, or operational to exchange information between a vehicle and a user thereof. For example, a user interface 104 can include an input to request an amount of torque for the vehicle, whereupon the user interface can detect the requested amount of torque. The user interface 104 can include an accelerator pedal wherein the user interface 104 can determine an amount of torque requested based on the position of the accelerator pedal. The accelerator pedal can receive an input from a user, such as by depressing the accelerator pedal, or via another vehicle system. An autonomous or semi-autonomous system (e.g., cruise control) can control a position of the accelerator pedal, or otherwise provide an indication of an amount of torque requested. For example, the user interface 104 can include one or more inputs to select a speed, destination, or the like to the user interface 104 whereupon the autonomous or semi-autonomous system can provide a message requesting a torque to be applied to one or more wheels. For example, the autonomous or semi-autonomous system can provide a requested speed, whereupon another component of the data processing system 100 can detect an amount of torque for a wheel, axle, or the like corresponding to such a speed.

The user interface 104 can detect one or more drive modes for the vehicle. For example, the user interface 104 can detect a drive mode engagement or disengagement requested by a user (e.g., traction control, vehicle stability control, track-mode, gravel-mode, or dune-mode). The drive modes can be generated in response to a user input, or in response to a surface detected by the surface detection engine 106. The user interface 104 can present an indication of a drive mode (e.g., to a user), or can omit a presentation of the drive mode. For example, the user interface 104 can provide or omit an indication of "traction control disabled" or a snow mode, off-road mode or ice mode. The user interface 104 can include a selection of a drive mode to alternate between a fixed slip target 122 and a variable slip target 122 based on a user input. For example, the user interface 104 can include mechanical switch, radio button, or other selectable control (e.g., via a touchscreen interface). The user interface 104 can present the control to the user, and receive a response from the user indicating a desired drive mode.

The user interface 104 can include or interface with a network interface such as a wired or wireless network interface. For example, the network interface can connect to various components of the data processing system, or a server remote from the one or more processors of the vehicle over a network. The network can include the internet, a cellular communications network, or satellite communications network. The user interface 104 can receive, via the network, an update to a data structure employed by the data processing system 100 to select a slip target or a slip target modifier. For example, the user interface 104 can receive an indication for an additional drive mode along with a corresponding data structure, another update from a server remote from the vehicle (e.g., remote from any processors thereof). The user interface 104 can receive updates to an existing data structure for an existing drive mode. The user interface 104 can receive updated values for a look up table (LUT) relating a requested amount of torque to a slip target modifier 124. For example, the update can update a previously included value, or include an additional dimension of a look up table (e.g., to add a dimension such as a dimension for tire wear or temperature).

The surface detection engine 106 can be designed, constructed, or operational to detect a characteristic of a surface on which the vehicle traverses. For example, the surface detection engine 106 can detect a slope, friction level, or surface type. The surface detection engine 106 can determine the friction level (e.g., coefficient of friction) or other surface characteristics based on a comparison of a torque applied to a wheel and a rate of wheel spin. The surface detection engine 106 can determine the friction level based on one or more measurements received from a vehicle sensor 102. The surface detection engine 106 can determine the friction level based on a sequential series of measurements. For example, the surface detection engine 106 can determine that a torque applied to the wheel corresponds to a greater wheel rotation than would correspond to a first level of friction. The data processing system 100 can thereafter provide a subsequent level of torque, less than the first level, and detect a subsequent corresponding rate of wheel spin. The surface detection engine 106 can determine the surface characteristics including the friction level based on a difference between a vehicle speed and a wheel speed.

The surface detection engine 106 can determine a deformability of a surface. For example, deformable surfaces can accumulate (e.g., dam) in front of a wheel, such that vehicle traction or other dynamics can vary from a non-deformable surface (e.g., ice) exhibiting a similar friction level. A wet surface can exhibit vehicle traction or other dynamics which vary from another deformable or non-deformable surface.

The surface detection engine 106 can determine a friction level corresponding to one or more wheels of the vehicle. The surface detection engine 106 can determine the friction level for a vehicle which can be a minimum friction, maximum friction, average friction (e.g., time average or average between wheels) for a wheel, axle, or vehicle. For example, the surface detection engine 106 can determine a minimum level of friction for an axle (e.g., an axle including at least two wheels connected through a differential, or for two wheel connected to separate motors). The surface detection engine 106 can determine a friction level for a vehicle, such as based on an average, minimum, or maximum friction determined for respective axles, wheels, trailers, or wheels. The surface detection engine 106 can determine additional characteristics of a surface such as a deformability, wetness, temperature, or location which can be relevant to an interface with a wheel of a vehicle traversing the surface. The surface detection engine 106 can detect or determine a drive mode for a vehicle based on the surface characteristics such as friction levels (e.g., a coefficient of friction) or other surface characteristics.

References to axles can refer to logical groupings of one or more wheels disposed along an axis perpendicular to a direction of travel of a vehicle. For example, an axle can refer to the front wheels of a vehicle or the rear wheels of a vehicle, which may or may not be mechanically interconnected (e.g., separate motors can provide tractive effort for each wheel; separate suspension components can couple to each wheel to provide wheel travel).

The electric motor 108 can be designed, constructed, or operational to transfer torque to a wheel. Wheels, as referred to herein, can refer to a wheel having a tire mounted there around, as in the case some road going vehicles. However, the present disclosure is not intended to be limited to such implementations. For example, the systems and method described herein can be employed with tires having integral wheels or tracks, or employing other sources of mechanical energy (e.g., a kinetic energy recovery system). The electric motor 108 can receive electrical energy from one or more batteries, alternators, or other sources. The electric motor 108 can generate mechanical energy from electrical energy received from the battery (e.g., via an inverter). The data processing system 100 can control the motor torque by control of any of the battery, the inverter, the motor, the differential or other gear or mechanical elements intermediating the electric motor 108 from a wheel (e.g., via communication with a controller thereof). The control of the torque provided can reduce an energy use of the battery which can reduce battery heating, increase vehicle efficiency, and lower carbon intensity of charging the vehicle.

Torque applied to the electric motor 108 can be controlled by a traction control system to control vehicle stability, traction, and increase vehicle efficiency. The traction control system can control other vehicle systems in combination with the electric motors 108. For example, the traction control system can apply braking (mechanical or regenerative) to one or more wheels while applying torque to one or more other wheels. The traction control system can control a suspension, differential, or other vehicle component to control vehicle dynamics or wheel speed.

The vehicle slip target engine 110 can be designed, constructed, or operational to determine a slip target for a vehicle. For example, the slip target engine 110 can receive a characteristic of a surface from the surface detection engine 106, an indication of a vehicle drive mode from the user interface 104, or an amount of torque requested from the user interface 104. The slip target engine 110 can perform a lookup in a data structure stored in memory to select a slip target modifier 124. For example, the lookup can depend on the amount of torque requested and the friction level.

The vehicle slip target engine 110 can adjust a slip target 122 used by a traction control system of a vehicle based on the slip target modifier 124. For example, the slip target engine 110 can provide a slip target modifier 124 to the traction control system. The vehicle slip target engine 110 can push an update to the traction control system (e.g., an slip target 122 or slip target modifier 124). For example, the slip target engine 110 can convey a slip target 122 or slip target modifier 124 to the traction control system according to a predefined period, responsive to a change of the slip target 122 or slip target modifier 124, or continuously update a location accessible to the traction control system (e.g., a memory mapped register). The traction control system can pull an update from the vehicle slip target engine 110. For example, the traction control system can convey a periodic message to the vehicle slip target engine 110 requesting a current slip target 122 or slip target modifier 124, convey a request to update the slip target 122 or slip target modifier 124 upon an actuation of the traction control system, or request an update responsive to another control input, such as an input of the user interface 104.

The vehicle slip target engine 110 can adjust a slip target 122 or slip target modifier 124 for a vehicle or an axle of a vehicle. For example, the vehicle slip target engine 110 can adjust a slip target 122 for a single axle drive vehicle (e.g., a rear wheel vehicle) such that the slip target 122 is applicable to a powered axle. Some vehicle can include multiple powered axles, or can include independent control of various wheels (e.g., can include a separate electric motors 108 for each wheel). The data processing system 100 can disaggregate a vehicle slip target 122 for individual trailers, axles, or wheels.

The slip target disaggregator 112 can be designed, constructed, or operational to select various slip targets 122 for a vehicle. The slip target disaggregator 112 can receive a vehicle slip target 122 from the slip target engine 110 and disaggregate a pre-determined vehicle limit for vehicle components such as axles, wheels, or trailers. The slip target disaggregator 112 can determine a slip target 122 for vehicle components such as axles, wheels, or trailers based on information received from the surface detection engine 106 (e.g., can determine or select disaggregated slip targets 122 or slip target modifiers which are not based on a vehicle-level slip target).

The slip target disaggregator 112 can select various slip targets corresponding to various vehicle components. For example, the slip target disaggregator 112 can select slip targets 122 for different wheels. For example, the slip target disaggregator 112 can receive a characteristic of a surface (e.g., a friction level) for multiple wheels of a vehicle, (e.g., each wheel of a vehicle) and an amount of torque requested for a vehicle. The slip target disaggregator 112 can determine a slip target 122 (e.g., a different slip target 122) for the various wheels. For example, the slip target 122 for each wheel can be based on the vehicle torque requested and the friction level for the wheel.

The slip target disaggregator 112 can determine different slip target modifiers 124 for particular motors based on different data structures. Each motor can correspond to a different wheel. The data structures can be based on a requested amount of torque, a friction level, a speed, a steering angle, or a vehicle turning radius. For example, a vehicle can include each of a first electric motor 108, second electric motor 108, third electric motor 108, and fourth electric motor 108. Each electric motor 108 can connect to a different wheel associated with a different friction level. The slip target disaggregator 112 can select a slip target 122 for the first electric motor 108, the second electric motor 108, the third electric motor 108, or the fourth electric motor 108 based on a first data structure. The slip target disaggregator 112 can adjust the slip target 122 for each of the first electric motor 108, the second electric motor 108, the third electric motor 108, or the fourth electric motor 108 based on a different additional data structure for each wheel, different from the first data structure. Each additional data structure can include a respective slip target modifier 124 based on, for example, a requested amount of torque and a surface characteristic such as a friction level (e.g., coefficient of friction).

The slip target disaggregator 112 can determine different slip target modifiers for particular axles based on different data structures. The data structures can be based on a requested amount of torque, a friction level, a speed, a steering angle, or a vehicle turning radius. For example, a vehicle can include each of a front axle and a rear axle. The slip target disaggregator 112 can select a slip target 122 for each of the front axle and rear axle based on one or more data structures (e.g., a same or different data structures including same or different slip targets 122). The slip target disaggregator 112 can adjust the slip target 122 for each of the front axle or rear axle based on a different additional data structure for each axle, different from the first data structure. Each additional data structure can include a respective slip target modifier 124 based on, for example, a requested amount of torque and a surface characteristic such as a friction level (e.g., coefficient of friction).

Figure 2:
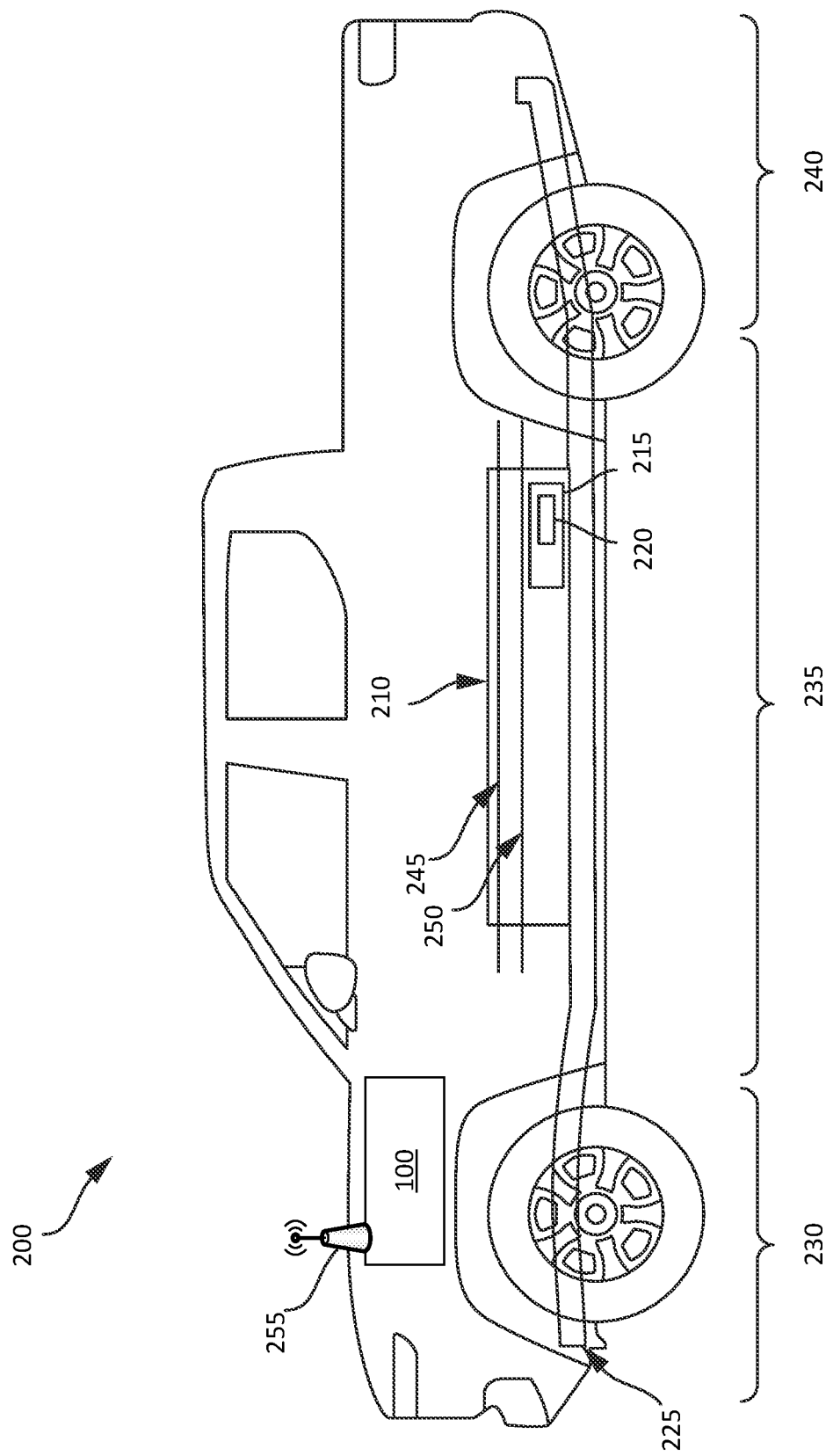
FIG. 2 depicts an example electric vehicle.

FIG. 2 depicts an example cross-sectional view of an electric vehicle 200 installed with at least one battery pack 210. Electric vehicles 200 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The electric vehicles 200 can interface with a surface through at least on wheel, track, propeller, or other interface. The battery pack 210 can also be used as an energy storage system to power a building, such as a residential home or commercial building. Electric vehicles 200 can be fully electric or partially electric (e.g., plug-in hybrid) and further, electric vehicles 200 can be fully autonomous, partially autonomous, or un-crewed. Electric vehicles 200 can also be human operated or non-autonomous. Electric vehicles 200 such as electric trucks or automobiles can include on-board battery packs 210, batteries 215 or battery modules 215, or battery cells 220 to power the electric vehicles 200. The electric vehicle 200 can include a chassis 225 (e.g., a frame, internal frame, or support structure). The chassis 225 can support various components of the electric vehicle 200. The chassis 225 can span a front portion 230 (e.g., a hood or bonnet portion), a body portion 235, and a rear portion 240 (e.g., a trunk, payload, or boot portion) of the electric vehicle 200.

The battery pack 210 can be installed or placed within the electric vehicle 200. For example, the battery pack 210 can be installed on the chassis 225 of the electric vehicle 200 within one or more of the front portion 230, the body portion 235, or the rear portion 240. The battery pack 210 can include or connect with at least one busbar, e.g., a current collector element. For example, the first busbar 245 and the second busbar 250 can include electrically conductive material to connect or otherwise electrically couple the battery 215, the battery modules 215, or the battery cells 220 with other electrical components of the electric vehicle 200 to provide electrical power to various systems or components of the electric vehicle 200.

The electric vehicle 200 can include one or more components of the data processing system 100. The electric vehicle 200 can include one or more network interfaces (e.g., wired or wireless transceivers 255) to connect to a remote server. For example, the electric vehicle 200 can receive updates to various data structures from remote servers via the network interfaces. For example, the network interface (e.g., wireless transceiver 255) can connect to a cellular, WiFi, or Bluetooth network. The network interface can receive updates to various slip targets 122 or slip target modifiers 124 in various data structures corresponding to the vehicle, axles, wheels, or electric motors 108 thereof.

Figure 3:
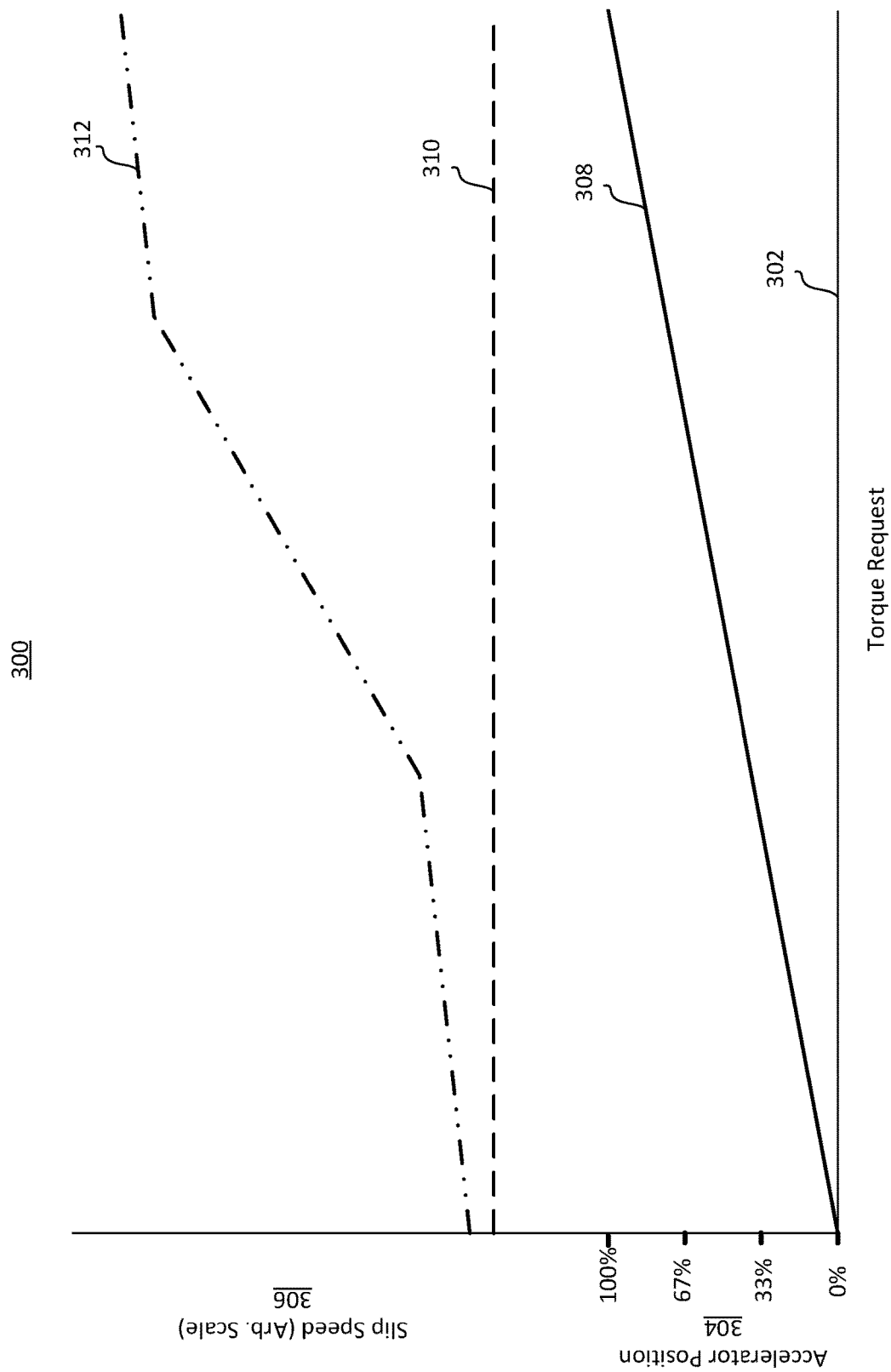
FIG. 3 depicts an example of a slip angle chart depicting a relationship between an amount of torque requested and a slip target in various drive modes.

FIG. 3 depicts an example of a slip angle chart 300 depicting a relationship between an amount of torque requested 308 and a slip target in various drive modes. A torque request axis 302 can extend for a torque request range (e.g., a percent of a maximum or an amount of torque requested 308). For example, the torque axis can extend from 0% to 100%, or 0 Nm to 1000 Nm. Perpendicular to the torque request axis 302, each of an accelerator position axis 304 and a slip speed axis 306 are depicted. The accelerator position axis 304 relates to a position of an accelerator pedal. Other inputs such as an autonomous or semi-autonomous driving system, an emergency braking system, or a battery protection system can modify a request for torque received from the acceleration pedal or otherwise provide an amount of requested torque 308 detectable by the data processing system 100. As depicted, the accelerator position linearly correlates with an amount of torque requested 308. Such a linear correlation is not intended to be limiting. Various vehicles can include non-linear relationships between a pedal position or other inputs and an amount of torque requested 308.

The slip speed axis 306 depicts a slip speed for two drive modes. The slip speed axis 306 is provided as an arbitrary scale. The slip speed can be about 1 kph, 5 kph, 3%, of vehicle speed, 5% of vehicle speed, or any other value. A first drive mode 310 can correspond to operation with traction control engaged, or operation on a high traction, non-deformable surface (e.g., asphalt or concrete) wherein the slip speed is fixed. A second drive mode 312 can correspond to operation with traction control disengaged, or operation on a low traction, or deformable surface (e.g., ice, sand, or silt) wherein the slip speed is variable based on the torque requested.

A slip speed of a mode of operation such as the second drive mode 312 can be linear (not depicted) or non-linear. For example, the slip speed can increase linearly at a rate for a torque request less than one third of maximum available torque, a different rate for a torque request between about 33% and 67% of maximum available torque, and a different rate still for a torque request between about 66% and 100% of maximum available torque. Various functions can provide various slip speeds. A slip speed can vary based on a source of an input (e.g., a slip speed may not increase for an input received from cruise control, but may from pedal activation). A slip speed can vary based on a particular throttle input. For example, a slip speed corresponding to 100% of requested throttle can be different or nonlinear relative to other requested torque values. A slip speed can vary based on a rate of pedal depression. For example, a smoothing function can be applied to accelerator pedal inputs, or inputs from an autonomous or semi-autonomous system.

Figure 4:
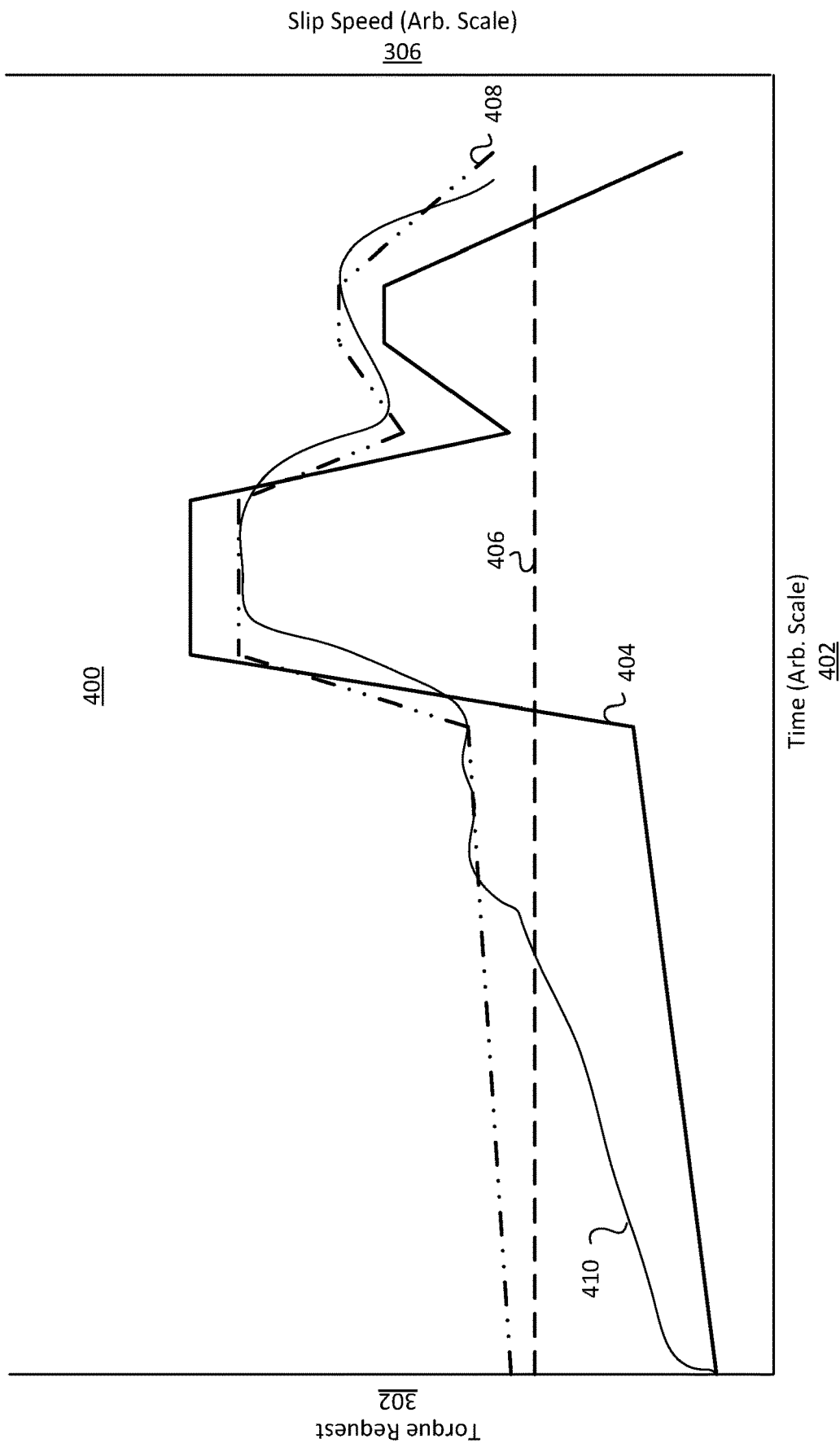
FIG. 4 depicts an example of a slip angle chart depicting a relationship between an amount of torque requested and a slip target over time.

FIG. 4 depicts an example of a slip angle chart 400 depicting a relationship between an amount of torque requested and various slip target over time. A torque request axis 302 is provided relative to a time axis 402. A torque request such as a temporal accelerator pedal position 404 is provided longitudinally (e.g., over time). A fixed slip target 406 is provided for reference. The slip target can correspond to a slip speed axis 306 or slip percent axis (not depicted). Merely for clarity of the figure, a longitudinal wheel speed corresponding to the fixed slip target 406 is omitted. Such a wheel speed can increase along with the accelerator position until reaching the fixed slip target 406, and thereafter maintain a position centered about the fixed slip target 406, deviating upwards or downwards responsive to changes in traction. A longitudinally variable slip target 408 is provided, wherein the longitudinally variable slip target 408 varies based on an amount of torque requested (e.g., the pedal position 404 as depicted). A longitudinal wheel speed 410 corresponding to the longitudinally variable slip target 408 is provided. As depicted, a greater slip speed can correspond to greater acceleration pedal position 404 such that a vehicle operator can observe an increase in wheel speed based on increased pedal positions 404 beyond a tractive limit of the vehicle, while maintain vehicle traction or stability. Exceeding the tractive limits can improve vehicle efficiency on some surfaces. For example, the data processing system 100 can select a drive mode having a highest efficiency on a detected surface, based on an input received from the surface detection engine 106. Such a system can increase battery life and lower carbon intensity for a vehicle which traverses a combination of dry, wet, deformable, non-deformable, cold, or warm surfaces, and can further reduce tire wear, and improve vehicle handling characteristics.

The depicted longitudinally variable slip target 408 can refer to a slip target for a vehicle, axle, or wheel. For example, different slip targets 122 can be generated for various components of a vehicle.

Figure 5:
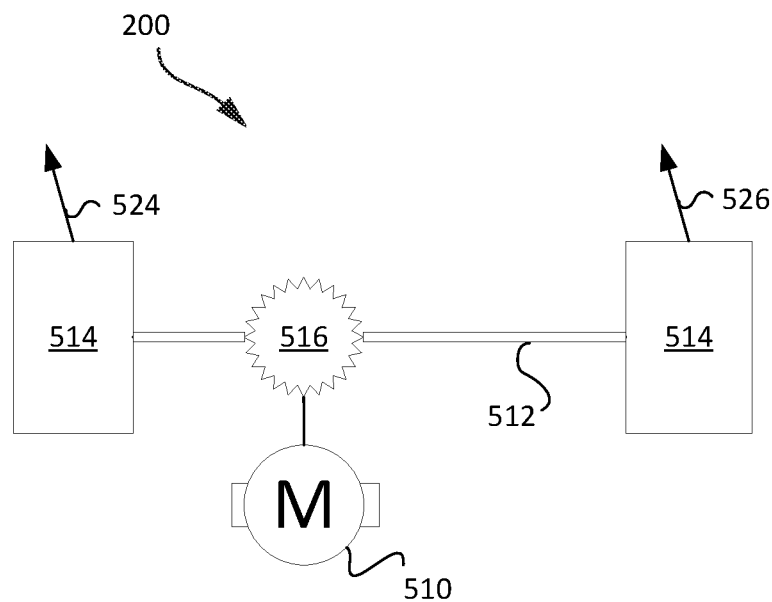
FIG. 5 depicts a block diagram of the example electric vehicle of FIG. 2.
Figure 5:
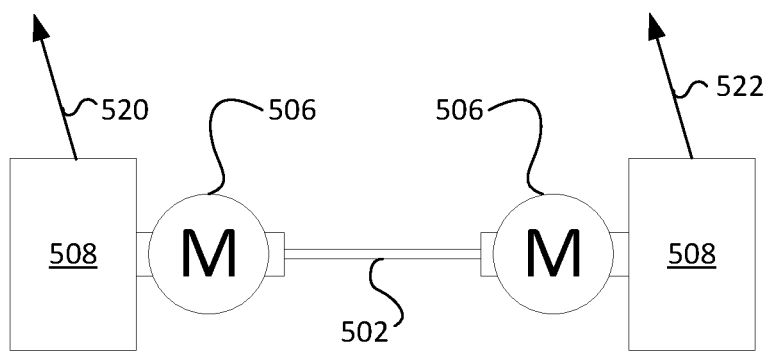

FIG. 5 depicts a block diagram of the electric vehicle 200 of FIG. 2. The electric vehicle 200 includes a rear axle 502 including or interfacing with rear electric motors 506 for each wheel. Some vehicles can include wheel assemblies including multiple wheels (e.g., dually trucks or tractor trailers, wherein each assembly of wheels connects to an electric motor). The rear axle 502 can mechanically couple the rear wheels 508, or include a logical assembly of rear wheels 508 which can be mechanically separate.

A front motor 510 connects to a differential 516 which, in turn, provides torque to the front wheels 514 of the front axle 512. Vehicles can include additional or fewer components. For example, Vehicles can include a center differential linking the front axle 512 and rear axle 502, or can omit a drive unit from a front axle 512 or rear axle 502. The slip target disaggregator 112 can provide different slip targets 122 to the front axle 512 and rear axle 502 (e.g., to one or more wheels thereof), which can cause differing torque to be applied to front wheels 514 and rear wheels 508, causing a different rotational speeds. The rear wheels 508 can rotate at velocities 520, 522 which are different from the velocities 524, 526 of the front wheels 514, which can cause the vehicle to oversteer (e.g., when the velocities 520, 522 of the rear wheels 508 exceeds the velocities 524, 526 of the front wheels 514). The data processing system 100 or a differential can apply a different torque to the left and right wheel to prevent oversteer or excessive tire wear, or enable torque vectoring (e.g., to allow inner or outer wheels to rotate at different speeds), or a same torque (e.g., to maintain wheel movement for certain friction levels). For example, each of the rear velocities 520, 522 or front velocities 524, 526 can be different or equal. For example, while traveling in sand or gravel at low speeds, or when the vehicle is traveling in a straight line, the slip target disaggregator 112 can provide a same torque to left and right sides of the vehicle.

Figure 6:
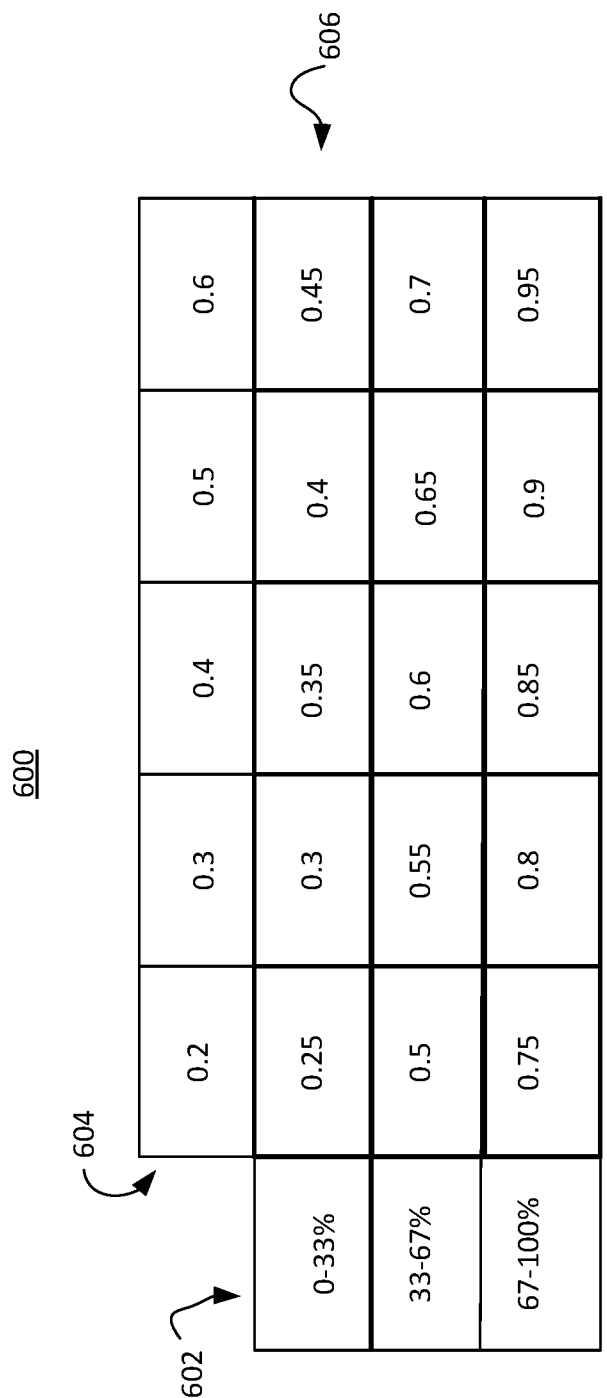
FIG. 6 depicts an example look up table (LUT) including various slip target adjustment values.

FIG. 6 depicts an example look up table (LUT) 600 including various slip target adjustment values (e.g., slip target modifiers). The LUT 600 includes a first dimension 602 corresponding to an amount of torque requested. For example, the amount of torque requested can correspond to an accelerator pedal position. As depicted, a range of throttle pedal positions can be divided into defined ranges, such as thirds of a total range. Additional divisions can be present (e.g., into tenths, hundredths, or thousandths, or defined according to a continuous function). The LUT 600 includes a second dimension 604 including a friction level of a surface (e.g., a coefficient of friction). As depicted, a range or various thresholds of friction levels can be included. For example, a friction level of between less than 0.2, between 0.2 and 0.3, between 0.3 and 0.4, and so forth can be provided.

For each intersection of the first dimension 602 and the second dimension 604, the data processing system 100 can select a slip level modifier value 606. Each slip level modifier value 606 can be a multiplier or other operator to modify a friction level. For example, the depicted slip level modifier values 606 can increase corresponding to higher torque requests, so that wheel spin increases upon a depression of an accelerator pedal. The depicted modifiers can increase corresponding to higher traction surfaces so that greater slip speeds can be generated on asphalt (e.g., which can correspond to higher speed operation relative to operation on snow or ice).

Although the depicted LUT 600 includes two dimensions, some LUTs 600 or other data structures can include any number of dimensions, such that vehicle operation or detection of drive modes can vary. For example, a single data structure can describe, or various LUTs 600 can be generated for various drive modes of a vehicle, corresponding to speeds, friction levels, accelerator input, temperature, or other characterizations of a surface received by the surface detection engine 106. The data processing system 100 can employ such surface characterization to select a LUT 600 or other data structure which uses a least amount of energy to traverse the surface.

Figure 7:
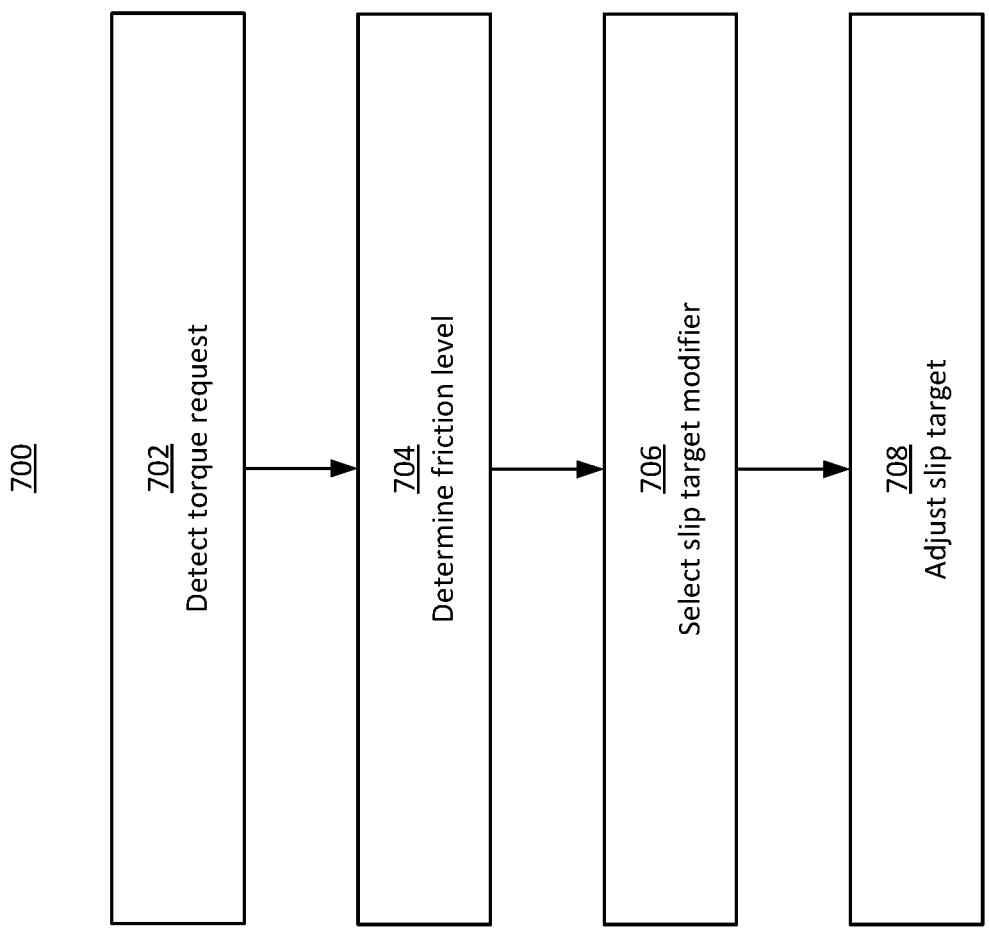
FIG. 7 is an example flow diagram of a method for adjusting a slip target based on an accelerator pedal.

FIG. 7 depicts an example flow diagram of a method 700 for adjustable slip targets. The method 700 can be performed by one or more systems or components depicted in FIG. 1, FIG. 2, or FIG. 5 including, a data processing system 100 or an electric vehicle 200. For example, the method 700 can be performed by one or more processors of an electric vehicle 200 and a memory communicatively coupled thereto. At ACT 702, the electric vehicle 200 can detect a torque request. For example, the electric vehicle 200 can receive the torque request based on a position of an accelerator pedal. At ACT 704, the electric vehicle 200 can determine a friction level for a surface the vehicle traverses. For example, the surface detection engine 106 can determine various characteristics of the surface, based on environmental or vehicle data received from the vehicle sensors 102. The surface detection engine 106 can determine a closest match to one of a predefined set of drive modes based on the information received from the vehicle sensors 102. The vehicle can select a slip target 122 associated with the drive mode. For example, the vehicle can select a slip target 122 based on the friction level or other surface characteristic, or a selected drive mode such as based on an receipt, via the user interface 104, of a request to disable a traction control drive mode.

At ACT 706, the electric vehicle 200 can select a slip target modifier 124 based on the torque request. For example, the slip target modifier 124 can increase corresponding to an increased torque request such that a depression of an accelerator pedal (or another torque request input, such as an autonomous or semi-autonomous system) can result in increased wheel speed corresponding to an increase in wheel slip (e.g., according to the wheel slip target 122). At ACT 708, the electric vehicle 200 can adjust the slip target based on a slip target modifier 124. For example, the electric vehicle 200 can combine (e.g., multiply, add, subtract, or convolve) a slip target modifier 124 with a slip target 122. The electric vehicle 200 can provide the updated slip target 122 to one or more vehicle controllers such as a controller for a vehicle axle, wheel, or the like. The electric vehicle 200 can apply different slip target adjustments to different axles, wheels, or the like such that vehicle dynamic control can be adjusted based on a surface type. For example, the vehicle dynamics can be adjusted to favor oversteer, understeer, neutral handling, to maintain a movement of each wheel (which can prevent wheels becoming stuck in sand or silt, and can thus avoid energy being thereafter directed to wheels which to not contribute to the tractive effort of the vehicle). The electric vehicle 200 can adjust the slip targets 122 based on a predicted efficiency of the updated slip targets 122 which can increase vehicle range, decrease charging time, or lower carbon intensity of a battery recharge.

Figure 8:
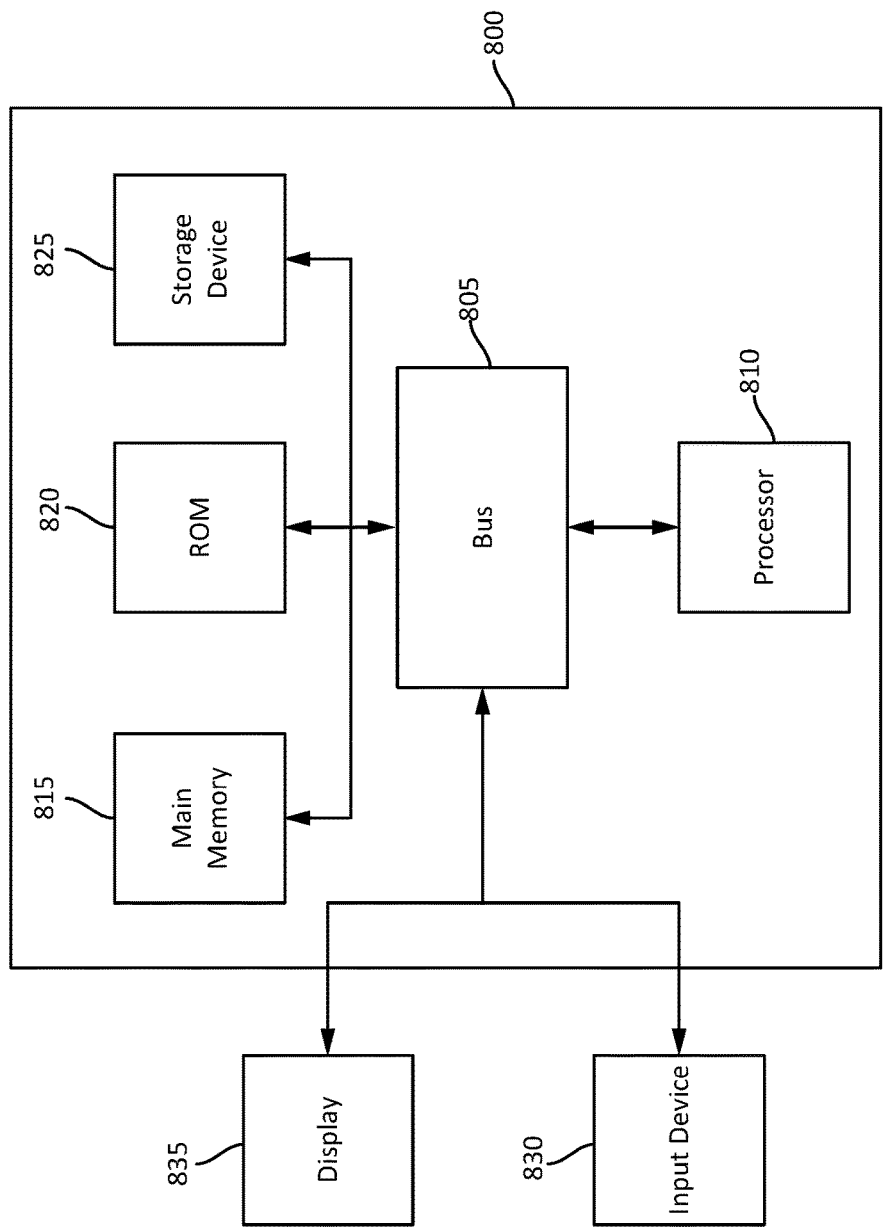
FIG. 8 is a block diagram illustrating an architecture for a computer system that can be employed to implement elements of the systems and methods described and illustrated herein, including, for example, the systems depicted in FIG. 1, FIG. 2, and FIG. 5 and the method depicted in FIG. 7.

FIG. 8 is a block diagram illustrating an architecture for a computer system that can be employed to implement elements of the systems and methods described and illustrated herein, including, for example, the systems depicted in FIG. 1, FIG. 2, and FIG. 5, and the method depicted in FIG. 7. The computing system 800 includes at least one bus 805 or other communication component for communicating information and at least one processor 810 or processing circuit coupled to the bus 805 for processing information. The computing system 800 can also include one or more processors 810 or processing circuits coupled to the bus for processing information. The computing system 800 also includes at least one main memory 815, such as a random access memory (RAM) or other dynamic storage device, coupled to the bus 805 for storing information, and instructions to be executed by the processor 810. The main memory 815 can be used for storing information during execution of instructions by the processor 810. The computing system 800 can include at least one read only memory (ROM) 820 or other static storage device coupled to the bus 805 for storing static information and instructions for the processor 810. A storage device 825, such as a solid state device, magnetic disk or optical disk, can be coupled to the bus 805 to persistently store information and instructions.

The computing system 800 can be coupled via the bus 805 to a display 835, such as a liquid crystal display, or active matrix display, for displaying information to a user such as a driver of the electric vehicle 200 or other end user. An input device 830, such as a keyboard or voice interface can be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
one or more processors and memory to:
detect an amount of torque requested for a vehicle;
determine a friction level associated with a surface on which the vehicle traverses;
select, based on the amount of torque requested for the vehicle and the friction level, a first slip target modifier for a first non-zero slip target for wheel slip corresponding to a first electric motor and a second slip target modifier for a second non-zero slip target for wheel slip corresponding to a second electric motor;
perform, using the amount of torque and the friction level, a lookup in a data structure stored in the memory to select the first slip target modifier and the second slip target modifier; and
adjust, based on the first slip target modifier, the first non-zero slip target corresponding to the first electric motor used by a traction control system of the vehicle, and adjust, based on the second slip target modifier, the second non-zero slip target corresponding to the second electric motor used by the traction control system.

2. The system of claim 1, comprising the one or more processors to:
adjust the first non-zero slip target used by the traction control system for wheel slip corresponding to a first axle of the vehicle based on a first portion of the friction level associated with wheels of the first axle; and
adjust the second non-zero slip target used by the traction control system for wheel slip corresponding to a second axle of the vehicle based on a second portion of the friction level associated with wheels of the second axle.

3. The system of claim 1, comprising the one or more processors to:
select, based on the amount of torque and the friction level, the first slip target modifier corresponding to a front axle of the vehicle;
select, based on the amount of torque and the friction level, the second slip target modifier corresponding to a rear axle of the vehicle, wherein the second slip target modifier is different from the first slip target modifier;
adjust the first non-zero slip target used by the traction control system of the vehicle for the front axle of the vehicle based on the first slip target modifier; and
adjust the second non-zero slip target used by the traction control system of the vehicle for the rear axle of the vehicle based on the second slip target modifier.

4. The system of claim 1, comprising the one or more processors to:
detect a drive mode of the vehicle;
select, based on the drive mode of the vehicle, the first slip target modifier corresponding to a front axle of the vehicle; and
select the second slip target modifier corresponding to a rear axle of the vehicle based on the drive mode, the amount of torque and the friction level, wherein the friction level comprises a coefficient of friction.

5. The system of claim 1, comprising the one or more processors to:
select, via a first data structure, the first slip target modifier corresponding to the first electric motor;
adjust the second non-zero slip target corresponding to the second electric motor by the second slip target modifier selected via a second data structure and based on the amount of torque and the friction level;
adjust a third non-zero slip target corresponding to a third electric motor by a third slip target modifier selected via a third data structure and based on the amount of torque and the friction level; and
adjust a fourth non-zero slip target corresponding to a fourth electric motor by a fourth slip target modifier selected via a fourth data structure and based on the amount of torque and the friction level.

6. The system of claim 1, comprising the one or more processors to:
determine a plurality of friction levels corresponding to a plurality of wheels of the vehicle; and
select a plurality of slip targets corresponding to the plurality of wheels based on the corresponding plurality of friction levels and the amount of torque requested for the vehicle.

7. The system of claim 1, comprising the one or more processors to:
receive, via a network from a server remote from the one or more processors, an update to the data structure used by the one or more processors to select the first slip target modifier.

8. The system of claim 1, comprising the one or more processors to:
determine the amount of torque requested for the vehicle based on a position of an accelerator pedal of the vehicle.

9. A method, comprising:
detecting, by one or more processors and memory, an amount of torque requested for a vehicle;
determining, by the one or more processors, a friction level of a surface on which the vehicle traverses;
selecting, by the one or more processors based on the amount of torque requested for the vehicle and the friction level, a first slip target modifier for a first non-zero slip target for wheel slip corresponding to a first electric motor and a second slip target modifier for a second non-zero slip target for wheel slip corresponding to a second electric motor;

perform, using the amount of torque and the friction level, a lookup in a data structure stored in the memory to select the first slip target modifier and the second slip target modifier; and adjusting, by the one or more processors, based on the first slip target modifier, the first non-zero slip target corresponding to the first electric motor used by a traction control system of the vehicle based on the first slip target modifier, and adjust, based on the second slip target modifier, the second non-zero slip target corresponding to the second electric motor used by the traction control system.

10. The method of claim 1, comprising:

performing, by the one or more processors, a lookup with the amount of torque and the friction level in a data structure stored in the memory to select the first slip target modifier.

11. The method of claim 9, comprising:

adjusting, by the one or more processors, the first non-zero slip target used by the traction control system for wheel slip corresponding to a first axle of the vehicle based on a first portion of the friction level associated with the first axle; and adjust the second non-zero slip target used by the traction control system for wheel slip corresponding to a second axle of the vehicle based on a second portion of the friction level associated with the second axle.

12. The method of claim 9, comprising:

selecting, by the one or more processors, based on the amount of torque and the friction level, the first slip target modifier corresponding to a front axle of the vehicle;

selecting, by the one or more processors, based on the amount of torque and the friction level, the second slip target modifier corresponding to a rear axle of the vehicle, wherein the second slip target modifier is different from the first slip target modifier;

adjusting, by the one or more processors, the first non-zero slip target used by the traction control system of the vehicle for the front axle of the vehicle based on the first slip target modifier; and adjusting, by the one or more processors, the second non-zero slip target used by the traction control system of the vehicle for the rear axle of the vehicle based on the second slip target modifier.

13. The method of claim 9, comprising:

detecting, by the one or more processors, a drive mode of the vehicle;

selecting, by the one or more processors based on the drive mode of the vehicle, the first slip target modifier corresponding to a front axle of the vehicle; and selecting, by the one or more processors, the second slip target modifier corresponding to a rear axle of the vehicle based on the drive mode, the amount of torque and the friction level.

14. The method of claim 9, wherein the vehicle comprises a plurality of electric motors, comprising:

selecting, by the one or more processors via a first data structure, the first slip target modifier corresponding to the first electric motor of the plurality of electric motors;

adjusting, by the one or more processors, the second non-zero slip target corresponding to the second electric motor of the plurality of electric motors by the second slip target modifier selected via a second data structure and based on the amount of torque and the friction level;

adjusting, by the one or more processors, a third non-zero slip target corresponding to a third electric motor of the plurality of electric motors by a third slip target modifier selected via a third data structure and based on the amount of torque and the friction level; and adjusting, by the one or more processors, a fourth non-zero slip target corresponding to a fourth electric motor of the plurality of electric motors by a fourth slip target modifier selected via a fourth data structure and based on the amount of torque and the friction level.

15. The method of claim 9, comprising:

determining, by the one or more processors, a plurality of friction levels corresponding to a plurality of wheels of the vehicle; and selecting, by the one or more processors, a plurality of slip targets corresponding to the plurality of wheels based on the corresponding plurality of friction levels and the amount of torque requested for the vehicle.

16. The method of claim 9, comprising:

receiving, by the one or more processors via a network from a server remote from the one or more processors, an update to a data structure used by the one or more processors to select the first slip target modifier.

17. The method of claim 9, comprising:

determining, by the one or more processors, the amount of torque requested for the vehicle based on a position of an accelerator pedal of the vehicle.

18. An electric vehicle, comprising:

one or more processors and memory to:

detect an amount of torque requested for the electric vehicle;

determine a friction level of a surface on which the electric vehicle traverses;

select, based on the amount of torque requested for the electric vehicle and the friction level, a first slip target modifier for a first non-zero slip target for wheel slip corresponding to a first electric motor and a second slip target modifier for a second non-zero slip target for wheel slip corresponding to a second electric motor;

perform, using the amount of torque and the friction level, a lookup in a data structure stored in the memory to select the first slip target modifier and the second slip target modifier; and adjust, based on the first slip target modifier, the first non-zero slip target corresponding to the first electric motor used by a traction control system of the electric vehicle, and adjust, based on the second slip target modifier, the second non-zero slip target corresponding to the second electric motor used by the traction control system.

19. The electric vehicle of claim 18, comprising:

a first axle and a second axle; and the one or more processors to:

adjust the first non-zero slip target used by the traction control system for the first axle of the electric vehicle based on the first slip target modifier.

\* \* \* \* \*